Sept. 5, 1950  W. L. MORRIS  2,521,079
APPARATUS FOR DETERMINING
THE PERMEABILITY OF CORES
Filed May 3, 1948
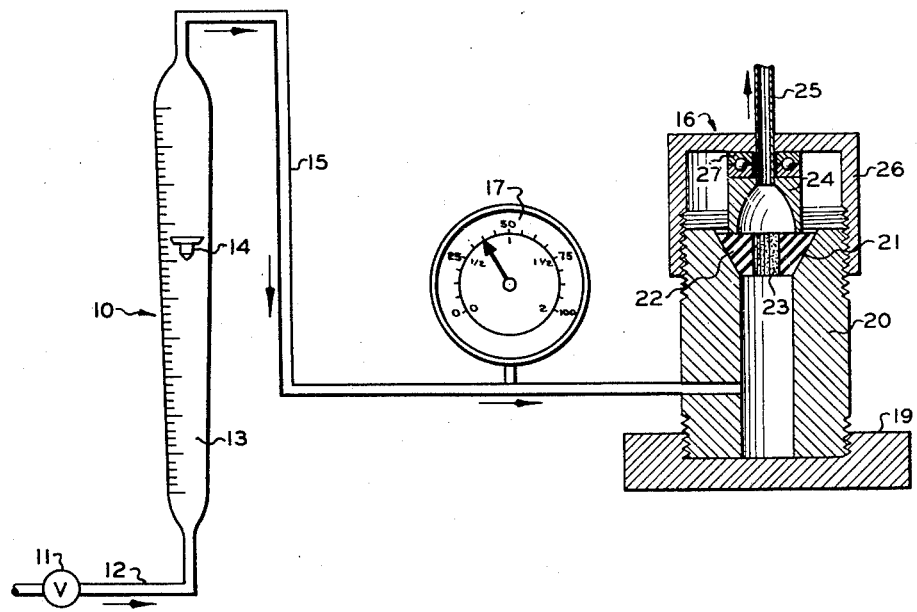
INVENTOR.
W.L.MORRIS
BY *Hudson & Young*
ATTORNEYS Patented Sept. 5, 1950

2,521,079

UNITED STATES PATENT OFFICE 2,521,079

APPARATUS FOR DETERMINING THE PERMEABILITY OF CORES

William L. Morris, Bartlesville, Okla., assignor to Phillips Petroleum Company, a corporation of Delaware Application May 3, 1948, Serial No. 24,866

2 Claims. (Cl. 73—38)

This invention relates to a permeameter. In another aspect, it relates to a meter which may be calibrated so that it reads directly in terms of permeability.

Heretofore, in determining the permeability of core samples taken from wells or bore holes, extensive calculations have been required to transform experimental data so as to obtain the desired information. The present invention relates to a permeability measuring device which gives a direct indication of the permeability of the core without the necessity for extensive and laborious calculations.

It is an object of the invention to improve the construction and operation of permeameters.

It is a further object of the invention to provide a direct reading permeameter which is simple in operation, economical to build and manufacture, and which gives reliable results.

It is a still further object of the invention to provide a permeameter which may be readily operated by an unskilled operator.

Various other objects, advantages and features of the invention will become apparent from the following detailed description taken in conjunction with the accompanying drawing, in which:

The drawing is a flow diagram illustrating the present invention with the core holder shown in section.

The invention resides in the novel combination of elements set forth in the following specification and defined by the appended claims.

Referring now to the drawing in detail, the direct reading permeameter comprising a flow-viscosity meter 10 to which a suitable fluid, such as water, may be fed through a pressure regulating valve 11 and a conduit 12. The meter is formed by a tube 13 disposed in a vertical position and having a generally frusto-conical configuration. The tube is so positioned that the diameter thereof is slightly larger at the top of the meter than at the bottom of the meter, and the tube is directly calibrated in units of permeability or millidarcys. A float 14 is carried within the tube 13 and this float includes a weighted shank portion having a cap secured thereto which is adapted to register with the calibration marks at the side of the tube. If desired, the upper part of the shank may be hollowed out to obtain the proper relation between the weight of the float and the viscosity-flow product of the fluid entering through conduit 12.

The meter 10 differs from conventional flow meters in that the position of the float indicates the value of the product of flow rate and viscosity whereas the ordinary flow meter is so constructed as to indicate the flow rate independently of the viscosity. The ideal construction for a viscosity-flow meter includes a spherical float in a conical tube. However, the described meter 10 gives indications of sufficient accuracy although the ideal construction is somewhat modified.

From the meter 10, the liquid flows through a line 15 to a core holder 16, and a pressure gage 17 communicates with the line 15 to indicate the pressure of the fluid. For a purpose to be hereinafter explained, the gage 17 may be conveniently calibrated in terms of core length.

The core holder 16 comprises a generally cup-shaped member defined by a base 19 and a tube 20 screw threaded thereto, the line 15 communicating with the central passage formed in the tube. A generally frusto-conical upper end portion 21 is provided on the tube 20 and a frusto-conical gasket 22 is seated in this top portion, the gasket having an axial passage formed therein for receiving a core 23 to be tested. A hollow member 24 is disposed at the top of gasket 22, this member receiving the liquid discharged through the core 23 and feeding it to an outlet or discharge conduit 25. A cap 26 is screw threaded on the tube 20 and a roller bearing 27 is positioned between the cap 26 and the member 24 to permit the cap to be screwed down tightly after the core is inserted into the holder, thereby to effect intimate engagement of resilient gasket 22 with the frusto-conical portion 21 and the core 23.

The operation of the permeameter will now be apparent to those skilled in the art. The permeability of the core may be expressed by the following equation:

$$K = \frac{VQL}{AdP}$$

where K represents permeability of the core, V represents viscosity of the fluid, Q represents the flow rate, L represents the length of the core, A represents the cross sectional area of the core and dP represents the pressure differential across the core. The cores used in routine analysis have a constant cross section and, accordingly, the quantity A in the above equation is a constant. However, the length of the sample may vary and such variations are compensated for by changing the pressure of the fluid passing through the system by valve 11, thereby to provide a constant value for the quantity $$\frac{L}{dP}$$

as the cores are measured. To this end, the meter 17 may be calibrated in terms of core length, the pressure being adjusted by valve 11 so that it is increased or decreased in correspondence with increases or decreases in core length. Thus, if a one inch core were to be tested, the operator would adjust valve 11 so that meter 17 read one inch or 50 pounds per square inch. This would provide a pressure differential across the core of such magnitude as to yield a predetermined constant value for the expression $$\frac{L}{dP}$$

Since the expression $$\frac{L\mu}{AdP}$$

is constant, it will be readily apparent that the permeability of the core is proportional to the product of viscosity and flow rate, which is the quantity measured by the meter 10. Accordingly, the meter may be calibrated directly in terms of permeability by the use of cores of known permeability. Thereupon, cores of unknown permeability may be placed in the holder and a direct reading of the permeability of such cores appears on the meter 10.

It will be apparent that the present permeameter is well adapted to core analysis and may be readily operated by an unskilled worker since it is only necessary to insert the core into the holder 16, adjust the valve 11 to set gage 17 to the proper core length, and then read the value of the permeability from the meter 10. It will also be noted that the present system is very simple and well adapted for economical manufacture and operation.

While the invention has been described in connection with a present, preferred embodiment thereof, it is to be understood that this description is illustrative only and is not intended to limit the invention, the scope of which is defined by the appended claims.

Having described my invention, I claim:

1. A direct reading permeameter comprising, in combination, a flow-viscosity meter including an inverted frusto-conical tube having a float therein, said tube being calibrated in units of permeability, a core holder, a line for establishing a flow of fluid through said meter into said core holder, and a pressure gage communicating with said line.

2. A direct reading permeameter comprising, in combination, a flow-viscosity meter including an inverted frusto-conical tube having a float therein, said tube being calibrated in units of permeability, a core holder, a line for establishing a flow of fluid through said meter into said core holder, a pressure gage communicating with said line and calibrated in units of core length, and means for varying the pressure of the fluid flowing through said line thereby to compensate for variations in length of the core in said holder.

WILLIAM L. MORRIS.

REFERENCES CITED

The following references are of record in the file of this patent:

UNITED STATES PATENTS

| Number | Name | Date |
|---|---|---|
| 2,345,935 | Hassler | Apr. 4, 1944 |
| 2,348,732 | Fischer | May 16, 1944 |

OTHER REFERENCES

Publication: "Proceeding of 3rd Conference Petroleum and Natural Gas Section," page 124, Bulletin 12, Penn. State College, School of Mineral Industries 1933. Copy in 73–38.